T. GOLDE.
HINGED VEHICLE HOOD.
APPLICATION FILED AUG. 8, 1911.
1,034,903.
Patented Aug. 6, 1912.
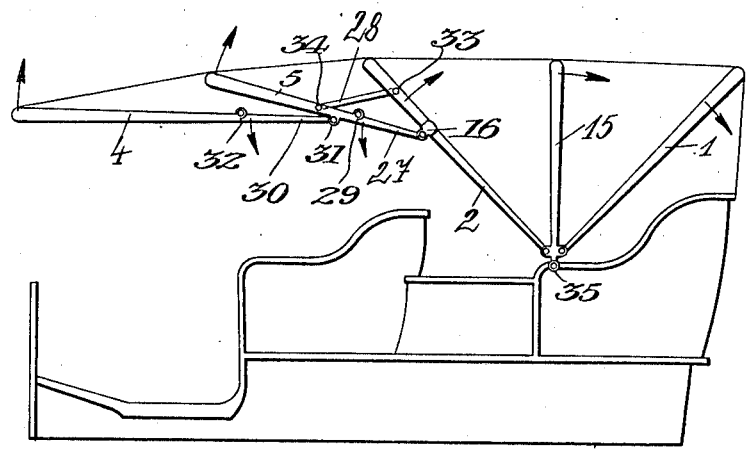
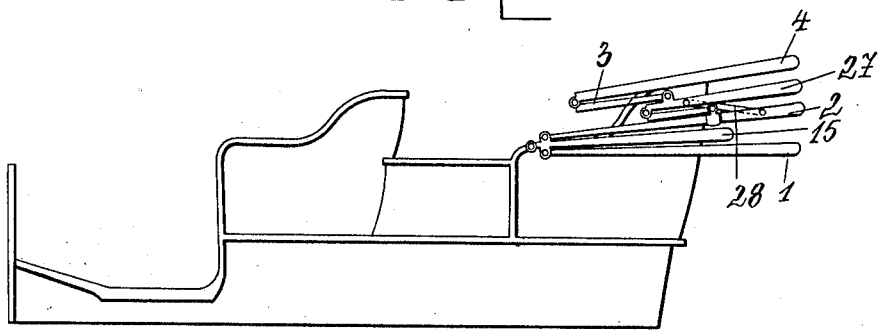

UNITED STATES PATENT OFFICE.

TRAUGOTT GOLDE, OF GERA, GERMANY.

HINGED VEHICLE-HOOD.

1,034,903.  Specification of Letters Patent.  Patented Aug. 6, 1912.

Application filed August 8, 1911. Serial No. 642,920.

*To all whom it may concern:*

Be it known that I, TRAUGOTT GOLDE, a subject of the Prince of Reuss, Younger Line, residing at Gera, Reuss, Germany, have invented a new and Improved Hinged Vehicle-Hood, of which the following is a specification.

This invention relates to a vehicle hood for automobiles and other vehicles, which may be readily folded and is effectively braced in a novel and efficient manner.

In the accompanying drawing: Figure 1 is a side view of a vehicle hood embodying my invention, showing it open, and Fig. 2 a similar view showing it closed.

The hood comprises essentially a pair of rear bows 1, 2 which are pivoted to an intermediate bow 15, the latter being in turn pivoted to the carriage body at 35. To bow 2, there are pivoted at 16, the upwardly inclined rear members 27 of an articulated intermediate bow 5 having joints 29. To bow 5 are in turn pivoted at 31, the rear members 30 of an articulated outrigger bow 4 having joints 32. Diagonal braces 28 which are pivoted to bow 2 at 33 and to bow 5 at 34, serve to sustain the latter in the inclined position desired.

It will be seen that by the peculiar construction described, the intermediate bow 5 will effectively support the canvas top and relieve the latter as well as the several hinges from undue strain.

I claim:

A vehicle hood comprising a rear bow, an articulated intermediate bow having rear members that are pivoted to said rear bow, an articulated outrigger bow having rear members that are pivoted to the intermediate bow, and braces that pivotally connect the intermediate bow with the rear bow.

In testimony whereof I affix my signature in the presence of two witnesses.

TRAUGOTT GOLDE.

Witnesses:
 J. STEPHAN,
 CHARLES NEUER.

Copies of this patent may be obtained for five cents each, by addressing the "Commissioner of Patents, Washington, D. C."